May 15, 1951        H. E. STASIEK        2,552,652
FORESTRY TOOL
Filed Sept. 3, 1947
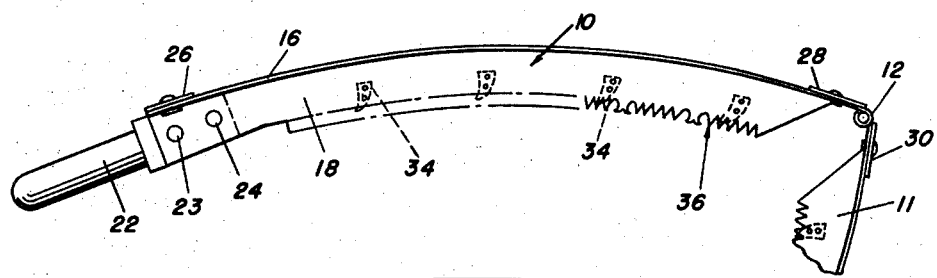
FIG_1
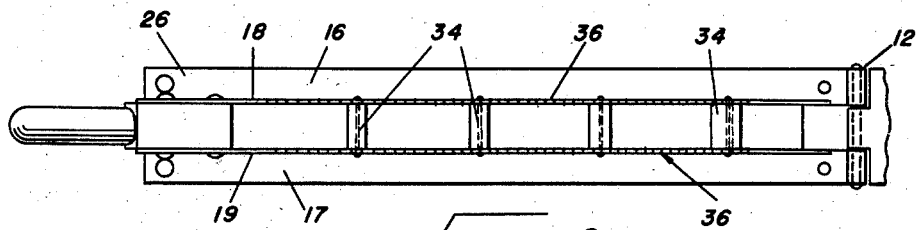
FIG_2
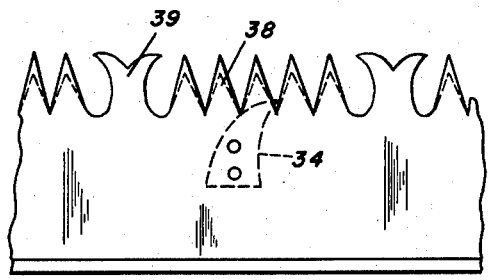
FIG_3
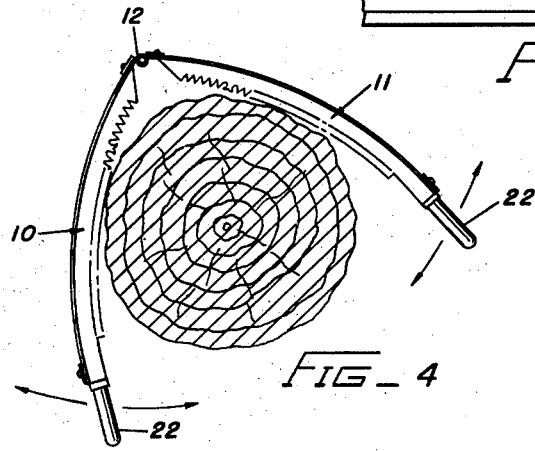
FIG_4
INVENTOR.
HENRY E. STASIEK
BY Barnes, Kisselle,
Laughlin & Raisch
ATTORNEYS.

Patented May 15, 1951

2,552,652

UNITED STATES PATENT OFFICE 2,552,652

FORESTRY TOOL

Henry E. Stasiek, Chicago, Ill.

Application September 3, 1947, Serial No. 771,965

2 Claims. (Cl. 30—166)

This invention relates to a forestry tool more particularly to a tool for girdling a tree.

Foresters have occasion to kill trees intentionally at times for purposes of thinning or due to the condition of the particular tree. It is sometimes desirable to stop the growth of the tree before it is cut down and removed.

A tree receives it life through the bark, and the removal of bark around the tree at any one point will kill the tree. This is a process used by foresters and is called "girdling."

It is an object of the present invention to provide a tool which will "girdle" trees with much less effort and expenditure of time than is required when using the usual tool available such as, saw, axe, or hatchet and which avoids the unsightly scar left by such tools.

Brief description of the several views of the drawing:

Figure 1 is a plan view of the device showing a full blade and portion of another, Figure 2 is a side view of the cutting edge of a blade, Figure 3 is an enlarged view of the blade, Figure 4 is a view of the complete tool in work position.

As shown by the drawings, the device is composed of two curved cutting members 10 and 11 joined for relative movement by a pintle hinge 12.

Each cutting member is composed of two curved angle pieces 16 and 17 having flat blades 18 and 19 in parallel relation. At one end the blades are held in spaced relation by a handle 22 to which the blades are fastened by rivets 23 and 24. A reinforcing plate 26 also joins the angle members 16 and 17. The handle has a rectangular portion to lie between the blades and a rounded portion for the hand.

At the other end the angle portion are secured in spaced relation by plates 28 and 30 of the pintle hinge 12, the plates being riveted to the angled portion of the blades.

Spaced along the cutting member are chisel teeth 34 which also serve to add rigidity to the cutting members. The edges 36 of blades 18 and 19 are provided with saw teeth of the triangular type 38 and of the raker type 39 (Fig. 3). The saw edge is curved as shown and it will be noticed that the chisel teeth 34 are so located that the cutting edge thereof lies inwardly of the points of teeth 38 and 39 to the extent that the teeth 34 come into operation only as the cutting progresses almost to the base of the flat teeth 38 and 39.

It is assumed that the parts of the cutter described will be formed of suitable material as known to the saw art. The dimensions of the device are not critical. It is desirable that the saw edges 18 and 19 be spaced an inch or inch and one-half apart.

In operation, as shown by Fig. 4, the tool is placed around the trunk of a tree and slight pressure is placed against the handles 22 to urge them together. Then the tool may be worked back and forth and gradually around the tree until the bark is cut through and chiseled away around the entire trunk.

It will be noted that the back portions of the angle members extend away from each other leaving the space between the blades clear for the escape of sawdust and chips.

The device is designed to accommodate itself to any except the smallest trees which, of course, may be easily girdled by a knife.

What I claim is:

1. A tree girdler comprising two slightly curved elongate cutting members connected together at one end for relative movement, pintle hinge means connecting the members permitting movement within the confines of parallel planes spaced the width of the cutting members, each cutting member comprising angle members having blade portions and back portions curved slightly, the blade portions being provided on the inside of the curve with saw teeth, means holding the backs of the angle members together in a position extending away from each other comprising a flat plate at one end and a hinge plate at the other forming a part of the pintle hinge and means to space and reinforce the blade portions in parallel relation comprising a handle at the end opposite the hinge having a rectangular section riveted between the blades and a rounded portion extending beyond the cutting marks, and chisel teeth fastened between the handle and the hinge at spaced intervals, the cutting edge of the chisel teeth lying on a curved line parallel to the saw teeth but in the vicinity of the base thereof.

2. A tree girdler comprising two slightly curved, elongate members connected together at one end for relative movement, means connecting the members at one end to permit movement within the confines of parallel planes spaced the width of the members, at least one of said members comprising a cutting member composed of curved parallel cutting blades having conventional saw teeth at the edges on the inside of the curve, and chisel teeth fastened between the blades with cutting edges transverse to the blades positioned in the vicinity of the base of teeth thereon.

HENRY E. STASIEK.

REFERENCES CITED

The following references are of record in the file of this patent:

UNITED STATES PATENTS

| Number | Name | Date |
|---|---|---|
| 104,453 | Haviland | June 21, 1870 |
| 642,973 | Galbreth | Feb. 6, 1900 |
| 725,546 | De Celle | Apr. 14, 1903 |
| 2,138,726 | Cartwright | Nov. 29, 1938 |

FOREIGN PATENTS

| Number | Country | Date |
|---|---|---|
| 61,673 | Sweden | of July 6, 1925 |